United States Patent [19]
Gritton

[11] Patent Number: 5,940,397
[45] Date of Patent: Aug. 17, 1999

[54] METHODS AND APPARATUS FOR SCHEDULING ATM CELLS

[75] Inventor: Gregory Vance Gritton, San Jose, Calif.

[73] Assignee: Adaptec, Inc., Milpitas, Calif.

[21] Appl. No.: 08/846,706

[22] Filed: Apr. 30, 1997

[51] Int. Cl.⁶ .................................................. H04L 12/56
[52] U.S. Cl. ......................................... 370/412; 370/468
[58] Field of Search .................................. 370/412, 468, 370/414, 418, 428, 416, 397, 444, 230, 231, 395, 235

[56] References Cited

U.S. PATENT DOCUMENTS

| | | | |
|---|---|---|---|
| 5,272,697 | 12/1993 | Fraser et al. | 370/397 |
| 5,491,691 | 2/1996 | Shtayer et al. | 370/412 |
| 5,579,312 | 11/1996 | Regache . | |
| 5,649,110 | 7/1997 | Ben-Nun et al. | 370/235 |
| 5,790,522 | 8/1998 | Fichou et al. | 370/468 |

OTHER PUBLICATIONS

Y. Suzuki, M. Nozaki, H. Ishida, H. Inoue and Y. Shiraishi "Design of Traffic Shaper Function in the End System", IEEE Nov. 14–16 (1995), Global Telecommunications Conf.—Singapore.

Unknown, "MB86687A Adaptation Layer Controller (ALC", Aug. 1996, Verison 2.0, pp. 1–6, Fujitsu Microelectronics, Ltd.

Unknown, "155 Mbps ATM SAR Controller for PCI–Based Networking Applications", Jan. 1996, pp. 1–26, Integrated Device Tech., Inc., Santa Clara, CA.

*Primary Examiner*—Chau T. Nguyen
*Assistant Examiner*—Phuongchau Ba Nguyen
*Attorney, Agent, or Firm*—Martine Penilla & Kim, LLP

[57] ABSTRACT

A method for scheduling and transmitting data cells includes providing a plurality of scheduling lists associated with a plurality of priorities that include a plurality of fields therein, assigning a virtual circuits to the scheduling lists by placing identifiers in some of the fields, sequentially indexing through the lists/fields, and transmitting specific data cells depending upon which identifier is indexed first given the priority of the scheduling lists. The method can include scheduling a next transmission time for a virtual circuit by determining an ideal time based a data rate associated with the virtual circuit, and placing an identifier in a field corresponding to the ideal time or the next available field within the scheduling list that the virtual circuit is assigned to. A scheduler includes a processor, an interface module and a buffer. The processor is configured to generate scheduling lists, assign virtual circuits to the scheduling lists, and index through the fields within the scheduling lists. The interface module allows the scheduler to access an external memory for storing the scheduling lists generated by the processor. The buffer is configured to transmit a data cell that is associated with an indexed virtual circuit over the network.

33 Claims, 11 Drawing Sheets

VC1 is a high priority CBR channel with a PCR equivalent to one cell every 3 scheduling cycles.

VC2 is a medium priority VBR channel with a PCR equivalent to one cell every 6 scheduling cycles.

VC3 is a low priority ABR channel.

VC4 is a high priority CBR channel with a PCR equivalent to one cell every 5 scheduling cycles.

VC1 is a high priority CBR channel with a PCR equivalent to one cell every 3 scheduling cycles.

VC2 is a medium priority VBR channel with a PCR equivalent to one cell every 6 scheduling cycles.

VC3 is a low priority ABR channel.

VC4 is a high priority CBR channel with a PCR equivalent to one cell every 5 scheduling cycles.

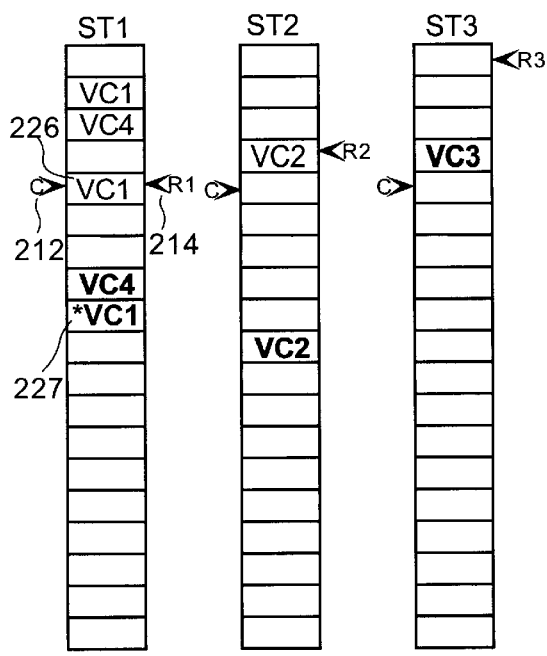
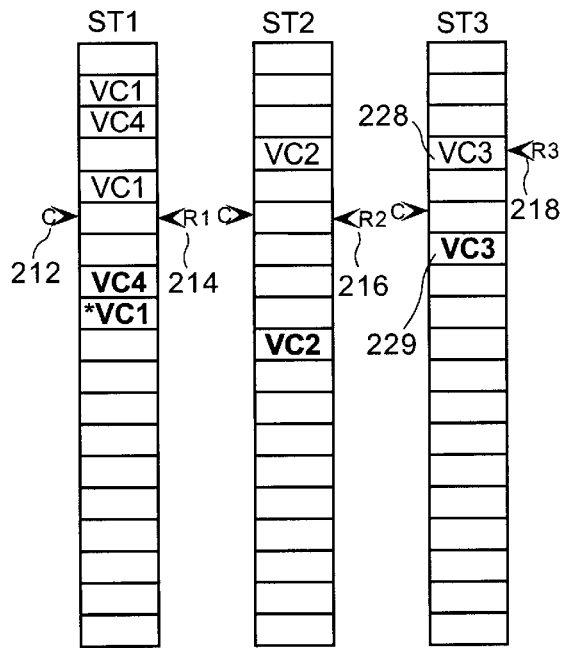
FIGURE 6f
FIGURE 6g
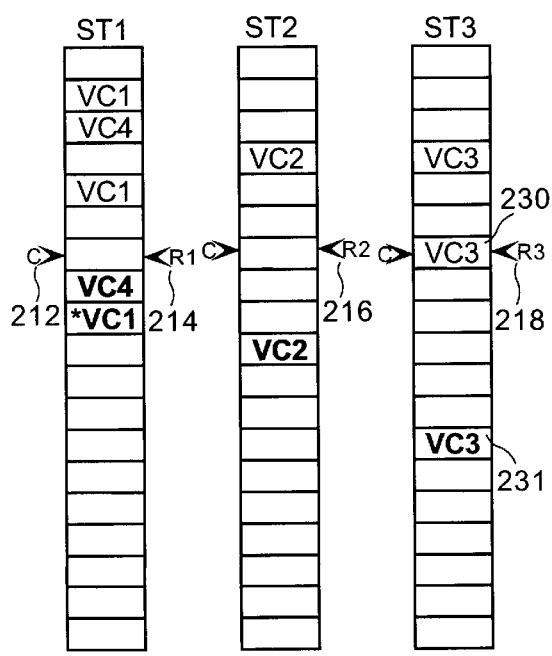
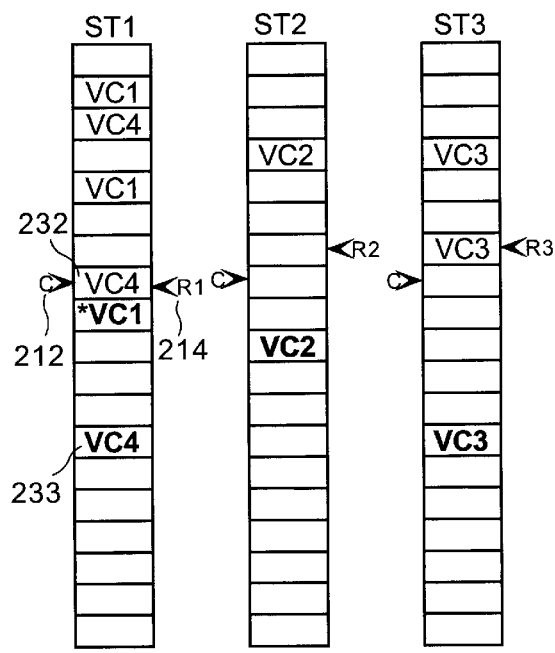
FIGURE 6h
FIGURE 6i

METHODS AND APPARATUS FOR SCHEDULING ATM CELLS

CROSS REFERENCE TO RELATED APPLICATIONS

This application is related to the following US patent applications: (1) Ser. No. 08/846,355 filed on the same day as the instant application, and entitled Programmable Memory Access Of Data To Be Transmitted, and (2) Ser. No. 08/846,707 filed on the same day as the instant application, and entitled Programmable Reassembly Of Data Received. These applications are herein incorporated by reference.

BACKGROUND OF THE INVENTION

1. Field of the Invention

This invention relates generally to data communications and the interface between a computer system and a network, and more particularly to methods and apparatuses for efficiently transmitting Asynchronous Transfer Mode (ATM) cells over an ATM network.

2. Description of the Related Art

ATM configured networks allow for high-speed data, voice and video communications to be conducted between endpoint computer systems. ATM networks, which are based on the transmission of fixed-length data packets, have proven to be extremely useful because they combine the benefits of both a switched network (e.g., constant transmission delay, guaranteed capacity) and a packet switched network (e.g., flexibility and efficiency for intermittent traffic).

Current ATM standards are defined by the International Telecommunication Union (ITU), and ATM Forum specifications, which are herein incorporated by reference. As is common in contemporary communications protocols, several protocol layers are used to functionally divide the communications task within an ATM network. The ATM protocol layers are similar in scope to the Open System Interconnection (OSI) reference model that is defined by the International Standardization Organization (ISO).

In ATM networks, a variable length PDU defines the data to be shared between higher protocol layers, such as the application layer software programs operating at the endpoint computer systems. A typical PDU includes the data to be shared along with additional header and trailer information. To transmit the PDU over an ATM configured network, each PDU is further divided into fixed-length transmission units, known as cells. A typical cell is 53 bytes long and includes a 5-byte header containing a connection identifier and a 48-byte payload. Thus, for example, a 480-byte PDU would be divided into ten cells, each cell having a 48 byte payload or one tenth of the PDU.

During transmission, a cell is sent from one endpoint computer system to another through a virtual circuit (VC) within the interconnecting ATM network. A VC typically consists of a concatenation of communication links established between the two endpoints where higher layer protocols are accessed. By definition, ATM cells are transmitted in a sequence over an established VC. As such, the VC must exist throughout the transmission of a PDU. One of the advantages of an ATM configured network is that a number of VCs can be established over a single wire or fiber connecting the sending computer system to the network by time-division multiplexing the cells from different PDUs.

Typically, an ATM Network Interface Card (NIC) and accompanying software are provided within the sending (or receiving) endpoint computer systems to transmit (or receive) the cells of a PDU over a VC. In terms of the OSI reference protocol model, a typical NIC provides link layer functionality by supplying cells in a specific sequence to the physical layer of the ATM network. In contrast, the VCs within the ATM network are typically established at a higher level layer, as are the PDUs and information therein.

FIG. 1a is a block diagram illustrating a typical ATM network having a first endpoint computer labeled host 12, a network 14, and one or more additional endpoint computers labeled end stations 16. Within network 14 there are illustrated, by way of dashed connecting lines, a plurality of virtual circuits 18 that represent the communication channels established between host 12 and end stations 16 during an ATM communication. By way of example, network 14 may include one or more telecommunications and/or data networks, having switching devices, routing devices, and dedicated communication lines and/or fibers that are capable of providing a communication link between host 12 and end stations 16. Host 12 and end stations 16 may, for example, be personal computer systems, workstations, mainframes, or other like processing devices that are capable of sending and receiving ATM PDUs.

FIG. 1b is a block diagram that illustrates one possible configuration of an endpoint computer system, such as host 12 in FIG. 1a, having a processor 20, a host bus 22, a system memory 24, a PCI controller 26, a PCI bus 28, a NIC 30, and an optional SCSI interface (I/F) 32 and SCSI device 34. Processor 20 can for example be a microprocessor or central processing unit (CPU) configured to access system memory 24. System memory 24 can for example be a dynamic random access memory (DRAM) that is accessed via host bus 22, or by way of another interconnecting circuit. SCSI device 34 can for example be a secondary data storage device, such as a disc drive unit, that can be accessed by processor 20 by way of host bus 22, PCI controller 26, PCI bus 28, and SCSI interface 32. As shown, processor 20 can also access network 14 by way of PCI bus 28 and NIC 30. It is recognized that additional processors and other devices and additional buses, etc., can be connected to either the host bus or PCI bus, as is common in modern computing configurations.

In a typical endpoint computer system, when the higher level protocol and/or application layers require a PDU to be transmitted over network 14 to another endpoint computer system several process steps typically occur. First, a VC is typically established by processor 20 via NIC 30. Next, the PDU is stored in system memory 24 by processor 20. Following that, NIC 30 is directed by processor 20 to complete the desired PDU transmission.

Thus, in order to complete the transmission of the PDU, in a typical configuration, NIC 30 needs to fetch the PDU data, segment it into cells, and transmit these cells, one-by-one, over a VC in network 14. As such, one important consideration in the design and operation of a NIC and associated software is the timing or scheduling of the cells for transmission over the network.

The ATM Traffic Management Specification, Version 4.0, available from the ATM forum and incorporated herein by reference for all purposes, specifies the types of traffic to be carried by an ATM network and various parameters associated with the transmission of cells over the network. For example, each VC can be assigned a traffic type based on the type of information being carried (e.g., video, voice or data), and/or the characteristics of the application using the VC. Currently, defined traffic types include Continuous Bit Rate (CBR), Variable Bit Rate (VBR), Available Bit Rate (ABR), and Unknown Bit Rate (UBR).

By way of example, a CBR VC or channel can include voice data which typically needs to be sent and received at a substantially constant rate. In this case, the NIC, for example, can transmit cells for the VC at a rate not to exceed a maximum transmission rate, known as the Peak Cell Rate (PCR), which is typically measured in cells per second. For a CBR channel the PCR is typically set when the VC is first established.

An example of a variable bit rate (VBR) channel is a VC carrying compressed video data. As its name implies, the allowed transmission rate for VBR channels varies with time according to a formula specified in the Traffic Management Specification and parameters that are negotiated when the VC is first established.

Data traffic is an example of the information that can be transmitted over an available bit rate ABR channel. Typically, ABR channels use any unused bandwidth available when other types of channels are not transmitting. Typically a feedback mechanism from the network is used to indicate when bandwidth is available.

Alternatively, data traffic can also be transmitted over a unknown bit rate UBR channel. Basically, when a VC is first established as a UBR channel, no bandwidth over the network is reserved for the channel. As a result, the NIC, for example, can transmit UBR cells up to a maximum PCR. Upon receiving these cells, the network will typically either accept them or reject them. Rejected cells, which are essentially dropped by the network, will therefore need to be re-transmitted. Re-transmission is typically accomplished through the higher level software layers.

Thus, schedulers need to have the capability to handle both static (e.g., CBR) and dynamic transmission rates (e.g., VBR & ABR). Additionally, schedulers must also have the capability to handle different priorities for each of the VCs. Typically, CBR channels are the highest priority followed by VBR, ABR, and then UBR channels. Further, to be considered ATM compliant, schedulers are usually required to ensure that cells are not transmitted too soon. As a result of these and other considerations, such as circuit complexity, cost, etc., conventional schedulers have not always provided optimal use of the ATM connection leading to the network, and/or the internal devices within the computer system.

By way of example, conventional schedulers can basically be grouped into one of three types depending on the internal scheduling method employed. The first type maintains a separate on-chip counter for each VC. Each of these counters is decremented a preprogrammed amount each cell transmission cycle, or some other timing event occurs. When the counter for a given VC reaches a particular value, the VC is eligible to have a cell transmitted. Since two VCs may have their respective counters reach the defined value at the same time, a arbitration mechanism is typically used to decide which VC is entitled to transmit first. An example of this type of a "counter per VC" scheduler is provided with the Orion and Gemini SAR chips (Models AIC-5900, AIC-5905, respectively) available from Adaptec, Inc. of Milpitas, Calif. One drawback to this type of scheduler is that there needs to be a separate counter for each VC. Thus, for large numbers of VCs, for example 1,000, there would need to be 1000 separate counters. As can be appreciated, this may not always be feasible.

The second type, which is similar to the first type, includes a counter for each of a number of defined transmission rates. Each VC is therefore assigned to one of the transmission rate/counters. When, for a given transmission rate, the counter reaches a particular value, a cell can be transmitted from each of the VCs assigned to the given transmission rate. Again this requires that an arbitration mechanism be provided to determine the exact ordering of the cells during transmission. An example of this type of a "counter per rate" scheduler is provided in the Fujitsu MB86687A chip documentation available from Fujitsu Microelectronics, Inc., San Jose, Calif.

While this second type of scheduler can support many VCs, there is a finite number of rates at which the VCs' cells can be transmitted. Unfortunately, this can decrease the efficiency of the ATM network and/or the computer systems attached thereto. Furthermore, implementing this type of scheduler to support dynamically changing transmission rates can be difficult, since several VCs may be assigned to share a given rate/counter. On the other hand, if a counter is dedicated for use by a single dynamic channel (e.g., VBR, or ABR) then the number of VCs that may be supported by the scheduler tends to decrease. This is especially true if several counters are each dedicated to specific dynamically changing VCs.

The third type of scheduler requires that a pre-scheduled list be created to specify the times at which the various cells associated with a multiplicity of VCs are to be sent. This is typically accomplished by way of a software algorithm running on a processor located in a host computer system. The pre-scheduled list is then provided to the NIC. An example of this type of a "pre-scheduled list" scheduler is provided in the Integrated Device Technology IDT77201 chip documentation available from Integrated Device Technology Inc., of Santa Clara, Calif.

The third type of scheduler can typically handle large numbers of VCs wherein each of the VCs can have a unique rate. Unfortunately, because this type of scheduler requires that the schedule be created in advance of the start of the first cell transmission time, it can not therefore be quickly modified to account for dynamically changing rates in one or more of the VCs.

Thus, what is desired are improved scheduling methods and apparatuses that more effectively multiplex cells from a plurality of VCs, allow each VC to have a unique transmission rate that can be dynamically adjusted, and can support a plurality of transmission priority levels.

SUMMARY OF THE INVENTION

The present invention provides scheduling methods and apparatuses that effectively multiplex cells from a plurality of VCs, allow each VC to have a unique transmission rate that can be dynamically adjusted, and can support a plurality of transmission priority levels.

In accordance with one aspect of the present invention there is provided a method for scheduling and transmitting data cells. The method includes providing a plurality of scheduling lists, such as for example a high-priority scheduling list that has within it a plurality of high-priority fields, and a low-priority scheduling list that has within it a plurality of low-priority fields. The method further includes assigning a first virtual circuit to the high-priority scheduling list by placing a first identifier in a first field in the high-priority scheduling list. Similarly, a second virtual circuit can be assigned to the low-priority scheduling list by placing a second identifier in a second field in the low-priority scheduling list. The method further includes sequentially indexing through the high-priority and low-priority fields at the same time with an indexing mechanism, and outputting or transmitting specific data cells depending upon which identifier is indexed first given the priority of the scheduling tables. Thus, the method includes transmitting a data cell associated with the first virtual circuit if the indexing mechanism indexes to the first field before reaching the second field, or if the indexing mechanism indexes to the first and second fields at the same time, or instead transmitting a data cell associated with the second virtual circuit if the indexing mechanism indexes to the second field before reaching the first field.

In one embodiment of the present invention the method can further include scheduling a next transmission time for a VC by determining an index offset from the current index based a data rate associated with the virtual circuit, and placing an identifier in a field corresponding to this index or the next available field within the scheduling list.

In accordance with yet another aspect of the present invention a scheduler is provided. The scheduler includes a processor, an interface module and a buffer. The processor is configured to generate a high-priority scheduling list and a low-priority scheduling list. The processor is capable of assigning a virtual circuit to the scheduling lists by placing a identifier in a field in the scheduling list. The processor is also configured to index through the plurality of fields in the scheduling lists. The interface module is coupled to the processor and capable of accessing a memory suitable for use in storing the scheduling lists generated by the processor. The buffer is coupled to the processor and configured to store at least one data cell that is associated with at least one of the virtual circuits. In one embodiment of the present invention the buffer supplies the data cell to the network during transmission.

BRIEF DESCRIPTION OF THE DRAWINGS

The invention, together with further aspects and advantages thereof, may best be understood by reference to the following description taken in conjunction with the accompanying drawings in which.

DETAILED DESCRIPTION OF THE PREFERRED EMBODIMENTS

The present invention will now be described in detail with reference to exemplary preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

The present invention provides scheduling methods and apparatuses that effectively multiplex cells from a plurality of VCs, allow each VC to have a unique transmission rate that can be dynamically adjusted, and can support a plurality of transmission priority levels.

In accordance with one embodiment of the present invention, a method for scheduling and transmitting data cells is disclosed. The method includes: (a) providing a plurality of scheduling lists associated with a plurality of priorities, each list having a plurality of fields; (b) assigning virtual circuits to the scheduling lists by placing identifiers in some of the fields; (c) sequentially indexing through the lists/fields; and (d) transmitting specific data cells depending upon which identifier is indexed first based on the priority of the scheduling lists.

The method may also include scheduling a next transmission time for a virtual circuit by determining an ideal time based on a data rate associated with the virtual circuit, and placing an identifier in a field corresponding to the ideal time or the next available field within the scheduling list. By scheduling the next cell's transmission time just after having transmitted the previous cell, this method is particularly well suited to respond to dynamically changing transmission rates.

The methods described herein may be implemented in one or more apparatuses, including, but not limited to integrated circuits, network interface circuits, network interface cards, computer systems, networks, network switching devices, and/or in computer implemented instructions stored in a computer-readable medium.

Figure 1A:
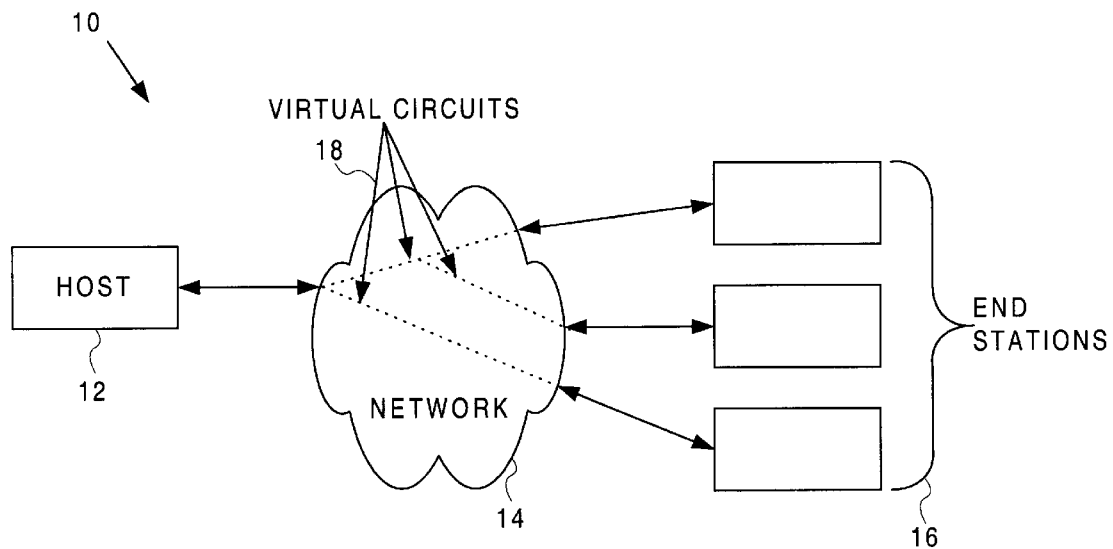
FIG. 1a is a block diagram illustrating a typical ATM network having a first endpoint computer, a network and several additional endpoint computers.
Figure 1B:
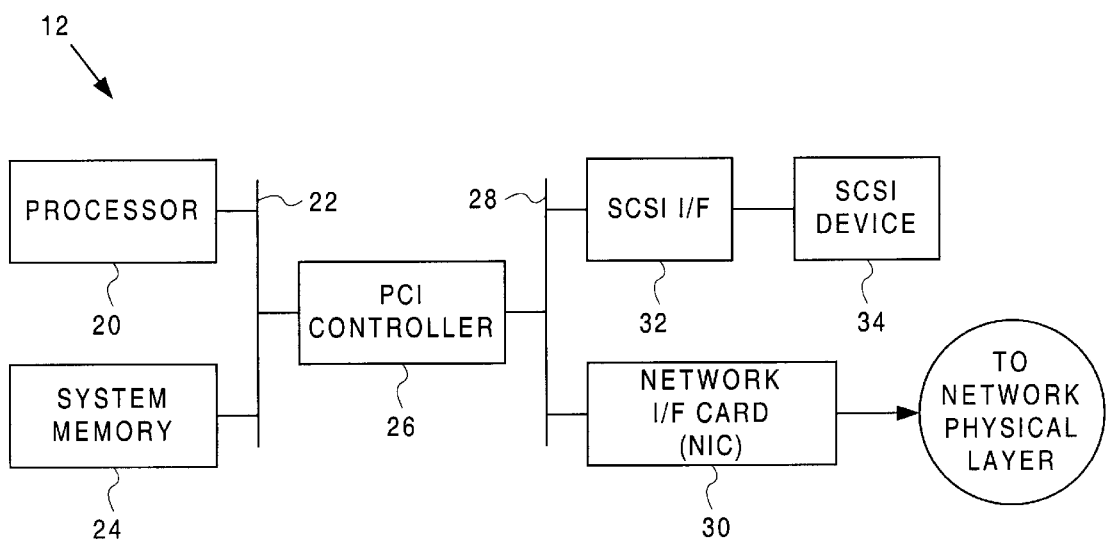
FIG. 1b is a block diagram illustrating a typical endpoint computer as in FIG. 1a, having a network interface card (NIC)
Figure 2:
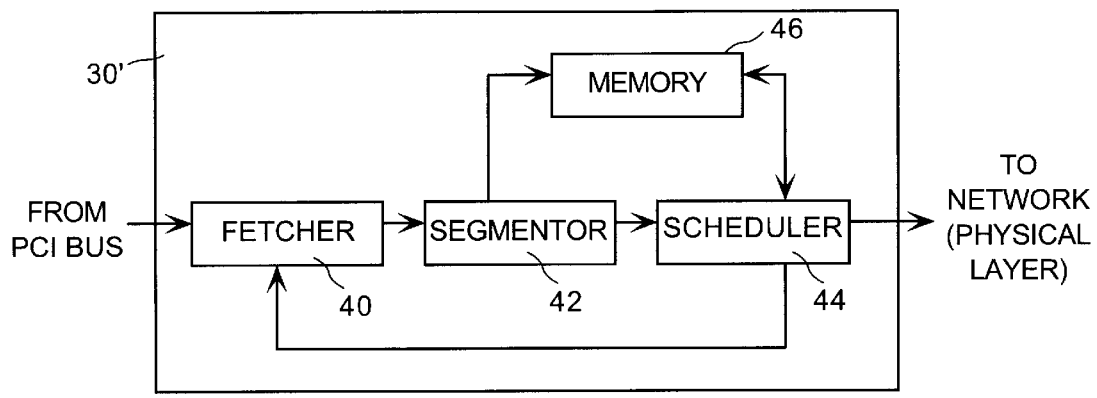
FIG. 2 is a block diagram illustrating an improved network interface circuit for use in a network interface card (NIC) having a scheduler in accordance with one embodiment of the present invention

With this in mind, FIG. 2 is a block diagram illustrating the transmit logic of an improved network interface card (NIC) 30', in accordance with one embodiment of the present invention. NIC 30' can be used for example within an endpoint computer, as illustrated in FIG. 1b, to interface with a network, such as for example an ATM network as illustrated in FIG. 1a.

Although additional functional blocks may be used, NIC 30' of this example only shows the functional blocks that are used to support transmitting data cells. By way of example, additional functional blocks may include blocks used in receiving data cells and/or resource management (RM) cells, and in establishing and maintaining the physical layer connectivity with the network itself. As such, those skilled in the art will recognize that additional functionality can be embodied in NIC 30'. For example, receiving methods and apparatuses relating to the present invention are described in greater detail in co-pending U.S. patent application Ser. No. 08/846,707, which is hereby incorporated by reference.

As shown in FIG. 2, NIC 30' includes a fetcher 40, a segmenter 42, a scheduler 44 and a memory 46. Fetcher 40 interfaces with PCI bus 28 and through PCI bus 28 is capable of communicating with processor 20 and system memory 24 as shown in FIG. 1b. Fetcher 40, segmenter 42 and memory 46 are also described in greater detail in co-pending U.S. patent application Ser. No. 08/846,355, which is hereby incorporated by reference.

Fetcher 40 is essentially a memory access circuit that can be requested by another circuit, such as processor 20 or scheduler 44, to read specific blocks of data out of host memory 24 through the PCI bus and provide the data blocks to segmenter 42. Segmenter 42 is basically configured to segment the fetched data blocks as received from fetcher 40 into a plurality of cells. By way of example, for an ATM transmission, segmenter 42 will segment the fetched block into 48-byte payloads and add a 4-byte header containing a connection identifier to produce a cell suitable for transmission over a virtual circuit (VC). Segmenter 42 stores the completed cell in a slot defined within memory 46. In segmenting and storing the cells associated with a PDU, segmenter 42 also produces a linked list that links each cell to the next preceding and subsequent cells (already fetched), if any, within the PDU. Once the linking is complete, these cells become "linked cells."

In one embodiment, memory 46 is coupled to segmenter 42 and scheduler 44 and is configured to store a plurality of linked cells as received from segmenter 42 in defined slots. Also, memory 46 is configured to store scheduling lists and data as received from scheduler 44. In a preferred embodiment, memory 46 is a static random access memory (SRAM) that can be programmably configured and is about 128 Kbytes to 2 Mbytes in size. However, it will be recognized that memory 46 may include any type of memory circuit and may be increased or decreased in size as required for a specific application.

In other embodiments, either segmenter 42 and/or memory 46 can function to manage the slots defined within memory 46. By way of example, segmenter 42 may be required to locate the address or location of the next available slot within memory 46. Similarly, once scheduler 44 has transmitted the cell within a slot, or otherwise emptied a slot, it may be required to communicate to either segmenter 42 and/or memory 46 that the slot is now available for re-use.

As shown in FIG. 2, scheduler 44 is preferably coupled to fetcher 40, segmenter 42 and memory 44. Scheduler 44 is tasked with retrieving cells from memory 46, for example based on a linked list of cells, and scheduling the cells for transmission over network 14 at specific times. Thus, for example, scheduler 44 can include processing circuitry and an associated computer implemented instruction set along with additional interfacing circuitry as required to interface with fetcher 40, segmenter 42, memory 44, and network 14.

In accordance with one embodiment of the present invention, once segmenter 42 has stored cells to memory 46 for transmission over a VC, segmenter 42 will communicate to scheduler 44 that the VC has cells stored within memory 46 which may be transmitted. Scheduler 44 may then determine the most appropriate time to transmit a cell. Scheduler 44 also monitors or otherwise identifies when the number of linked cells stored in memory 46, for a VC, falls below a programmable watermark level. Once the watermark level has been reached, scheduler 44 provides a feedback signal to fetcher 40 that directs fetcher 40 to fetch another block of data from system memory 24. Those skilled in the art will recognize that additional functions may be included within scheduler 44. By way of example, scheduler 44 may "generate," "schedule," "transmit," and/or "receive" RM cells such as those associated with maintaining the VC through network 14, in accordance with the ATM protocols.

Figure 3:
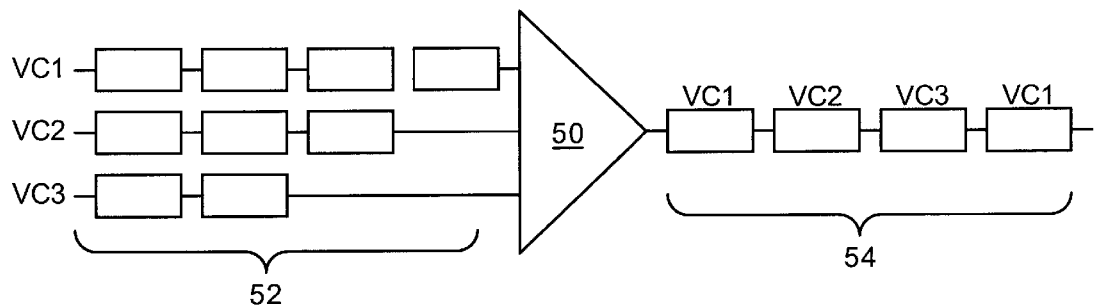
FIG. 3 is a block diagram illustrating the functionality of a scheduler as in FIG. 2, in accordance with one embodiment of the present invention.

FIG. 3 is a block diagram illustrating the functionality of scheduler 44 in accordance with one embodiment of the present invention. FIG. 3 includes a scheduler 50 that receives data cells 52 that are associated with one or more VCs, such as for example VC1, VC2 and VC3. Preferably, data cells 52 are interleaved or multiplexed in a particular order and transmitted over the network at specific times as transmitted cells 54. For example, data cells 52 can be retrieved from local memory 46 and interleaved in accordance with a priority scheme (e.g., based on the VC or type of traffic) and a data transmission rate associated with the VC. As illustrated, the interleaving results in transmitted cells 54 having a VC1 data cell followed by a VC3 data cell, a VC2 data cell, and then the next VC1 data cell.

Figure 4:
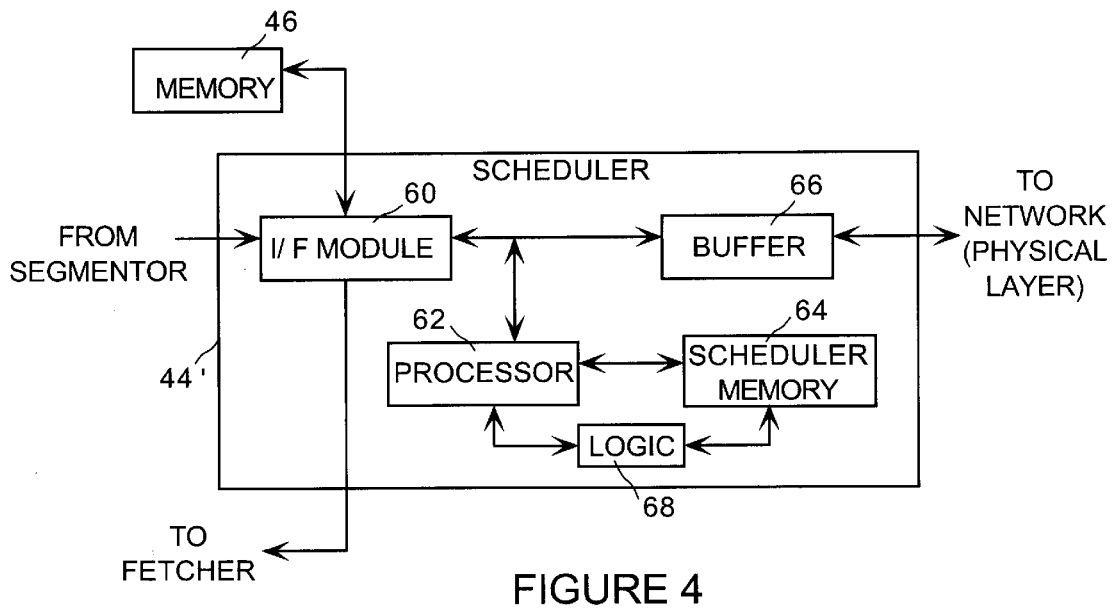
FIG. 4 is a block diagram of a scheduler as in FIGS. 2 and 3, in accordance with one embodiment of the present invention.

With this in mind, FIG. 4 is a block diagram of a scheduler 44' as in FIGS. 2 and 3, in accordance with one embodiment of the present invention. Scheduler 44' includes an interface (I/F) module 60, a processor 62, a scheduler memory 64, a buffer 66, and optional logic 68. Interface module 60 is preferably configured to receive one or more control signals from segmenter 42. These control signals, which can for example indicate that segmenter 42 has completed placing data cells into local memory 46, are passed by interface module 60 to processor 62. Interface module 60 also provides an interface to fetcher 40 over which a watermark signal, for example, can be passed from processor 62 to fetcher 40. Interface module 60 provides a further interface to buffer 66 over which data cells can be sent, for example from memory 46 to buffer 66 in response to one or more control signals generated by software instructions running on processor 62.

Processor 62 is preferably coupled to access scheduler memory 64 and local memory 46 (via interface module 60). Processor 62 can, for example, be a microprocessor that is capable of running a set of instructions that may be provided within scheduler memory 64. In a preferred embodiment, processor 62 is RISC processor that operates in accordance with a set of computer instructions stored within a program memory in scheduler memory 64. The computer instructions cause processor 62 to schedule and transmit data cells based on several factors, including for example the VC associated with the data cell, the transmission rate for the VC, the priority of the VC, and other factors relating to the arbitration of competing data cell transmissions (e.g., associated with other VCs). By way of example, to transmit a data cell that is stored in local memory 46, processor 62 can access local memory 46 via interface module 60 and copy or otherwise move the data cell from its slot in local memory 46 to buffer 66.

As will be described in greater detail below, processor 62 and its associated computer instructions generate and maintain two or more scheduling tables or lists within local memory 46 and/or scheduler memory 64. Each of the scheduling lists includes a plurality of fields for storing an identifier (e.g., unique data, name, and/or number, etc.) that specifies a particular VC. Thus, several VCs may be associated with each of the scheduling lists by having their identifiers listed in the fields of the scheduling list.

Furthermore, each of the scheduling lists are preferably associated with a unique transmission priority that defines which of the VCs will be transmitted first. For example, for a given transmission time, a data cell for a VC identified in a high-priority scheduling list can be transmitted before another data cell for a different VC identified in a low-priority scheduling list. As such, since only one data cell can be transmitted at a time, if both of these high-priority and low-priority data cells are scheduled to be transmitted during the same transmission cycle, the low-priority data cell will have to be delayed until a later transmission cycle because the high-priority data cell will be transmitted first (e.g., as scheduled). For example, the low-priority data cell may be transmitted during the next transmission cycle provided that no other higher-priority data cells are scheduled for that time.

To keep track of the transmission cycles or timing, processor 62 may include a timing function, for example in the form of an indexing mechanism that sequentially steps or indexes through the fields of each of the scheduling lists. By way of example, one or more pointers can be used to index field-by-field through the various scheduling lists wherein each indexing step represents a unique time. The current time can be, for example, a count of transmitted cells which is incremented every time a cell is transmitted (e.g., during each transmission cycle). This indexing mechanism and the related maintenance and use of the scheduling lists will be discussed in greater detail below.

Scheduler memory 64 can, for example, include the computer instructions for use by processor 62 and additional data storage for use by optional logic 68. Thus, scheduler memory 64 can include both ROM and RAM.

Optional logic 68 may include hardware that includes, for example a state machine in the form of combinatorial logic. Preferably logic 68 is designed to support processor 62 by quickly scanning the fields of the scheduling lists to determine if a VC is identified therein. For example, scheduler memory 64 can include one or more bitmaps that indicate the presence (e.g., logical "1") or lack thereof (e.g., logical "0") of an identifier within a field of the scheduling list or a portion thereof. These bitmaps can be used by logic 68 to quickly direct processor 62 to the next available or unassigned field, and/or the next occupied or assigned field in a particular scheduling list. Thus, while not always necessary, there is preferably at least one bitmap for each scheduling list. Additional, second level bitmaps may also be provided which essentially combine two or more lower level bitmaps. It is recognized, however, that the optimization provided by this bitmap scheme is optional, because if processor 62 can scan the scheduling lists fast enough (e.g., during a single transmission or indexing cycle) logic 68 may not be needed.

Buffer 66 is essentially a staging buffer that is used to temporally store interleaved data cells that are to be transmitted over the network. Thus, buffer 66 is preferably a first-in-first-out (FIFO) buffer capable of holding a plurality of data cells. Ideally, buffer 66 will be significantly fast so as to not introduce any significant additional delay to the transmission of the cell. In another embodiment, buffer 66 may be omitted by having a module contained within the scheduler 44' send data directly from memory 46 to interface module 60.

Figure 5A:
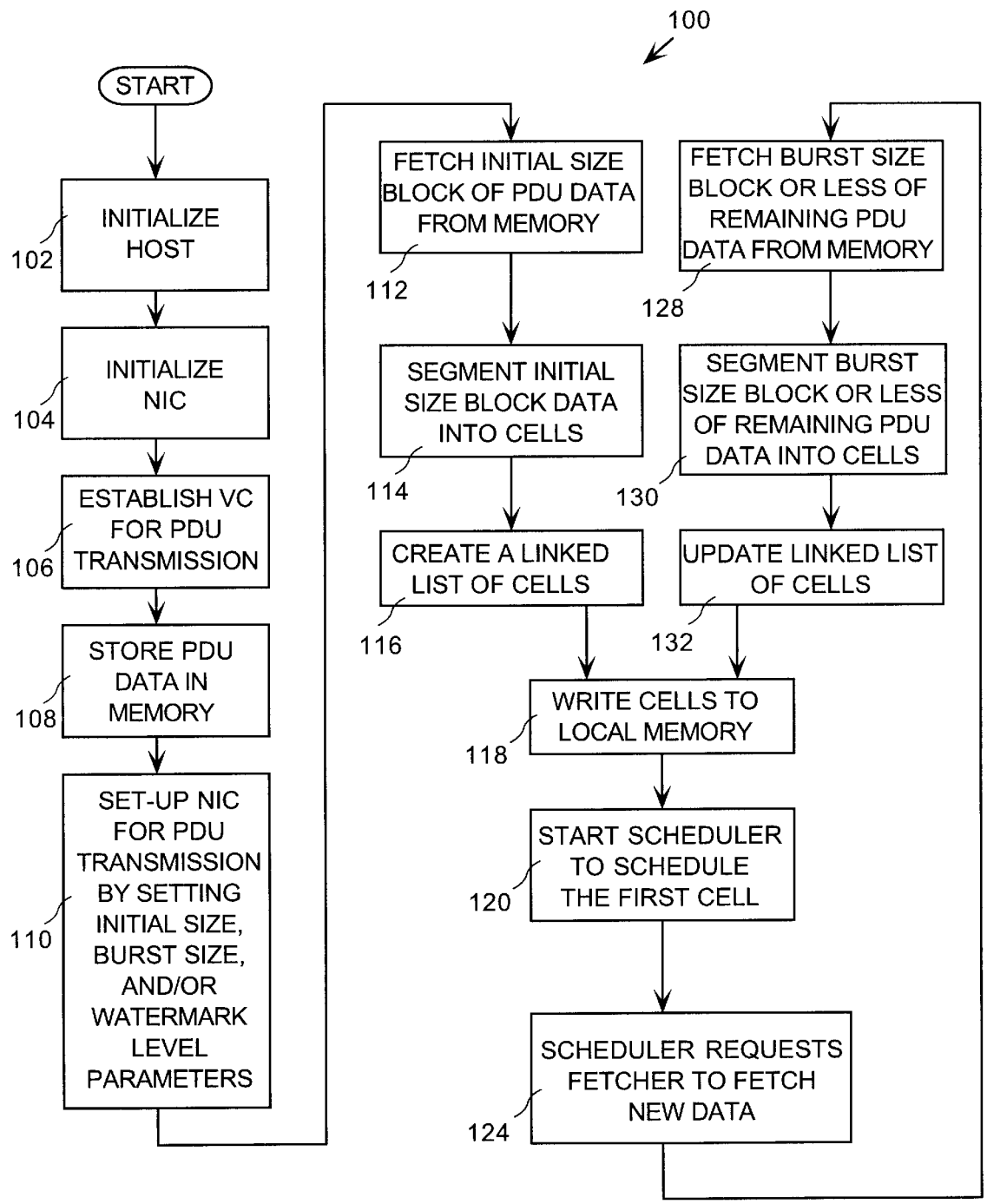
FIG. 5a is a flow-chart illustrating a method that includes a scheduling step in accordance with one embodiment of the present invention.

FIG. 5a is a flow-chart illustrating a method 100 for transmitting a data packet having a plurality of data payloads over a network connection, in accordance with one embodiment of the present invention. By way of example, the data packet may be embodied in NIC 30' of FIG. 2, and/or within associated computer implemented instructions and additional processing and logic circuitry.

As shown, method 100 includes step 102 wherein the host computer system or endpoint computer system and software are initialized. Step 102 can, for example, include booting up an operating system program, connecting/configuring the system and connected devices, etc. Next, step 104 includes initializing the NIC, which can include the "booting-up" of operating programs and related driver programs, and connecting/configuring the NIC and connected devices, etc.

Once the host and NIC are running, method 100 includes step 106 wherein the host and NIC are configured such that a VC is established for use in transmitting a PDU from the host to another computer system over the network. Step 106 can, by way of example, include connecting a physical layer interface in either the computer system, NIC, or other device to a network server, router, or switch over a line, wire, and/or fiber.

Having established a VC in step 106, method 100 step 108 includes generating, assembling, or simply providing by way of the computer system (or attached circuit) a PDU, and storing at least a portion of the PDU in the system memory or other storage medium within or connected to the computer system.

Once the type of PDU has been established in step 108 and at least a portion of it stored in memory, method 100 includes step 110 wherein the NIC is set-up or otherwise made aware of one or more programmable variables relating to the fetching cycle in accordance with one or more of the embodiments of the present invention.

In step 110, the host provides one or more of an initial size, a burst size, or a watermark level for use with the PDU. The initial size represents the amount of PDU data to be fetched by the NIC during the initial fetching cycle. This amount can be the entire PDU or a portion thereof. The burst size represents the amount of PDU data to be fetched by the NIC during subsequent fetching cycles following the initial cycle. The watermark level represents and indicator that establishes the point at which subsequent fetching cycles are to be conducted, based upon one or more parameters associated with the cells awaiting transmission, the number of open slots in memory, and/or the status of a VC.

The initial fetching cycle begins in step 112 wherein the NIC fetches an initial size block of PDU data from storage in the computer. This can, for example, include gaining access to one or more buses such as a PCI bus and/or a host bust through one more interconnected circuits/devices. Note that the type, including location, of the PDU was established in step 108 and provided to the NIC in step 110.

Next, in step 114 the initial size block is segmented into cells based on a plurality of payloads within the PDU. Once segmented, additional information in the form of data can be added to the payload to create a linked list of cells in step 116. By way of example, an identifier may be added to the payload to identify the sender and/or receiver, and a CRC or other form of security mechanism may be added as well. A linking mechanism is created in step 116 for use in keeping the cells in a predetermined order during transmission. By way of example, a linked list, table, counter, pointer or similar mechanism can be generated and provided for use in retrieving, scheduling and/or transmitting cells. The last of the linked cells, i.e., the last payload of the PDU, can also be identified or otherwise marked as the last cell for a PDU by way of the linking mechanism.

The linked cells created in step 118 are then stored in a local memory on-board the NIC. Preferably, the memory can be logically divided into slots and one cell can be stored in each slot. It is recognized, however, that other memory configurations can also be used as well. In step 120, the scheduler is invoked to schedule a cell for transmission. For ease of understanding, the details of step 120 will be discussed in FIG. 5d below.

In a preferred implementation, the scheduler will interleave cells from various VCs according to the VCs traffic parameters. This will be discussed in greater detail in FIG. 5b below. When the scheduler has transmitted enough cells so that the number of the currently linked cells awaiting transmission for the PDU has fallen below a watermark level for the PDU and/or VC, the scheduler will indicate to the fetcher that the fetcher should fetch more data in step 124.

From step 124, the method proceeds to step 128 which is the be-inning of a subsequent fetching cycle wherein a burst size block of the remaining PDU is fetched from the computer system. Step 128 is similar, therefore, to step 112. Next, in step 130, the burst block is segmented as was the initial block in step 114. In step 132, the linking mechanism, such as a linked list of cells, is updated to include the cells segmented from a burst block in step 130. Notice that step 132 is similar to step 116. After step 132, method 100 returns to step 118, and method 100 continues in this manner until the scheduler finishes transmitting the PDU.

Figure 5B:
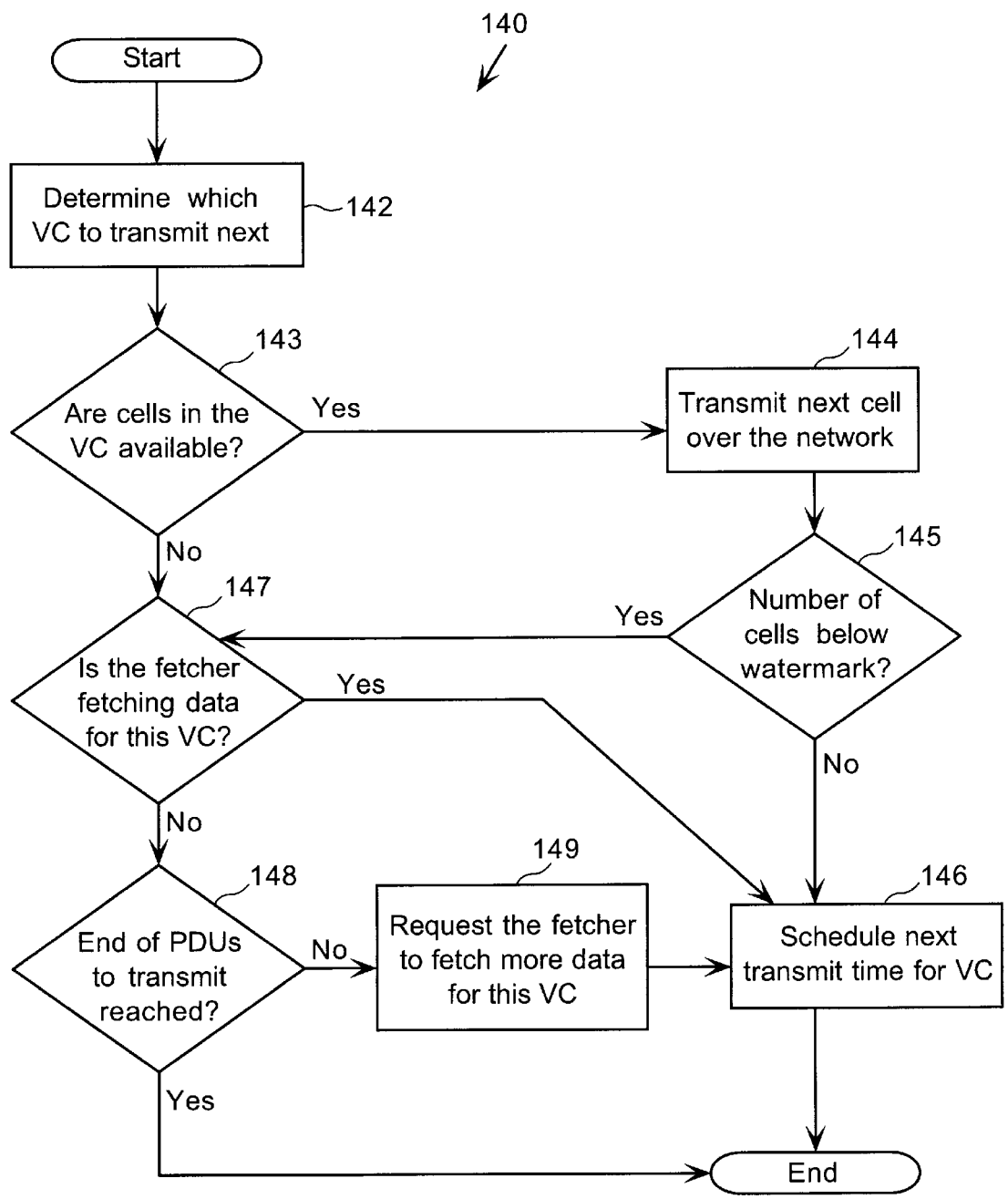
FIG. 5b is a flow-chart further illustrating a scheduling step which includes determining which VC to transmit next, transmitting that VC's next cell, and scheduling the next transmit time for a VC, as in FIG. 5a, in accordance with one embodiment of the present invention.

FIG. 5b is a flowchart that illustrates the operation of the scheduler during every cell transmission cycle, in accordance with one embodiment of the present invention. FIG. 5b shows a transmit cell method 140 that begins with step 142 where a determination is made as to which of the VCs will have a cell transmitted next. For ease of understanding, step 142 will also be described in greater detail below.

Once the next VC to transmit has been determined, step 143 indicates a decision step in which it is determined if there are cells in that VC available for transmission. If there are cells available for transmission, the method will transmit the next cell over the network in step 144. This can, for example, include retrieving the data cell from a memory and providing the memory cell to the network via a buffer and network interfacing circuitry. From step 144, the method proceeds to step 145 where it is determined if the number of cells have fallen below a watermark. If the cells have fallen below the watermark, the method will proceed to a step 147 where it is determined if the fetcher is fetching data for this VC. If the fetcher is fetching data for this VC, the method will proceed to step 146. On the other hand, if the cells have not fallen below the watermark as determined in step 145, the method will directly proceed to step 146.

In step 146, the next transmit time is scheduled for the next cell of the current VC. This can, for example, include marking or otherwise identifying a subsequent transmission cycle during which the next cell associated with the VC will be transmitted. Step 146 will also be described in greater detail below for ease of understanding.

If there are no cells available in the VC as determined in step 143, the method will proceed to step 147 where it is determined if the fetcher is fetching data for this VC as described above. In a preferred implementation, a bit in the data structures describing the VC is used for this purpose. If the fetcher is fetching data for this VC, then the method will likewise proceed to step 146 where the next cell transmission time is scheduled.

If the fetcher is not fetching cells for this VC in step 147, the method will proceed to step 148 where it is determined if the end of the PDUs to transmit has been reached. If so, no additional cells are scheduled in this VC, and the method ends. If the end of the PDUs to transmit has not been reached, the method will proceed to a step 149 where the fetcher is requested to fetch more data for this VC. Once the fetcher has fetched more data, the method will proceed to step 146 where the next cell transmission time is scheduled.

Figure 5C:
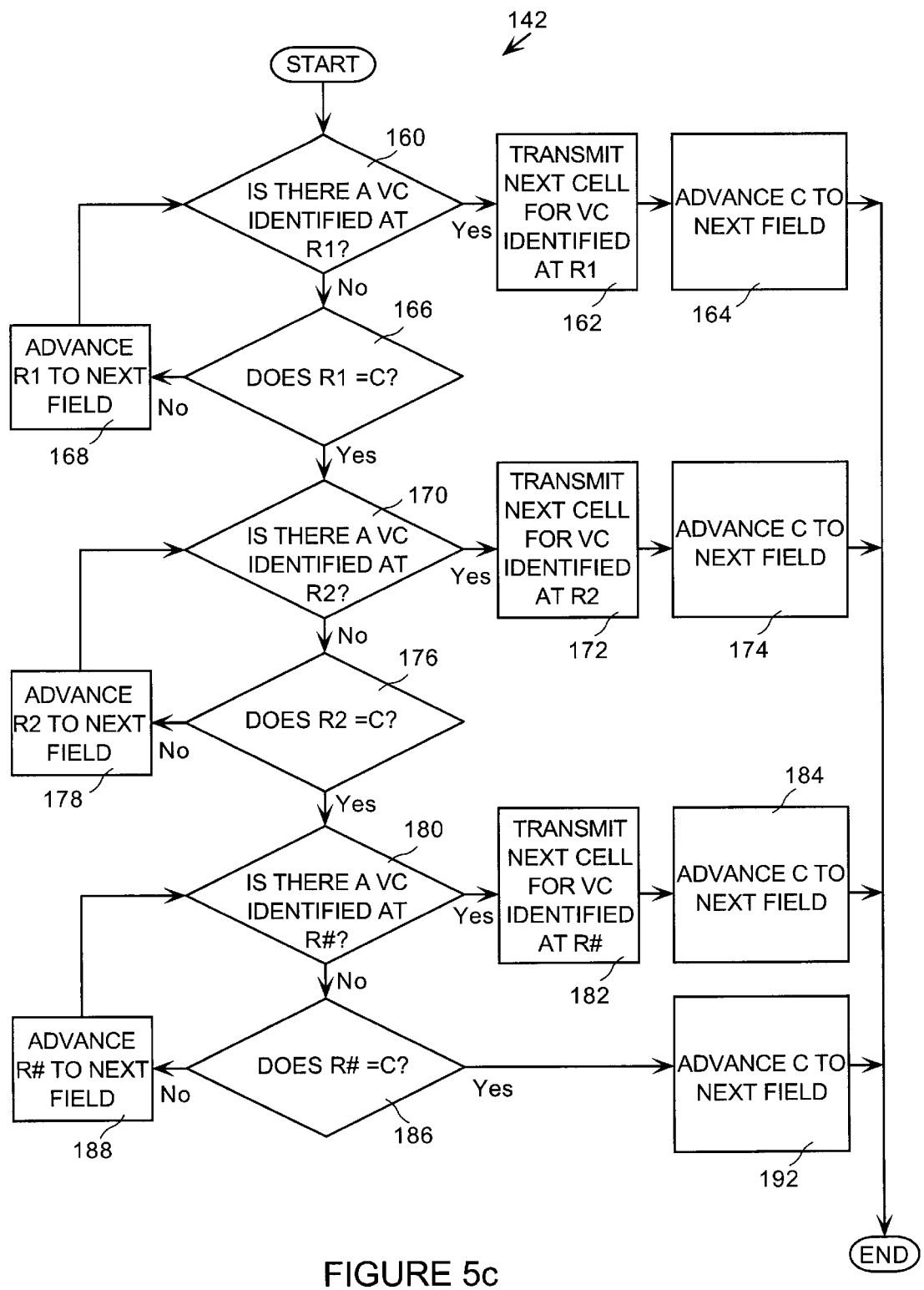
FIG. 5c is a flow-chart further illustrating steps for determining which VC to transmit next, and transmitting that VC's next cell as in FIG. 5b, in accordance with one embodiment of the present invention.

FIG. 5c is a flow-chart further illustrating one way to implement step 142 (i.e., determining which VC to transmit next) of FIG. 5b, in accordance with one embodiment of the present invention. In this embodiment, there are provided a plurality of scheduling lists, each of which are associated with a particular priority and contain a plurality of fields therein. For example, there can be a first scheduling list which is a high-priority scheduling list that includes a plurality of high-priority fields, and there can be a second scheduling list which is a low-priority scheduling list that includes a plurality of low-priority fields. Of course, additional scheduling lists can be provided having priorities that fall between the high and low priorities, respectively, of the first and second scheduling lists.

By way of example, in the preferred embodiment there are six scheduling lists, each of which contains about 4096 fields that can be individually assigned to a VC. Each of these scheduling lists is indexed by two different indexes. The first index, which represents the current transmission cycle (or current time), is common to all of the scheduling lists. The second index is unique to each of the scheduling lists. The second index represents a read time for the scheduling list. The read time for a given scheduling list essentially indicates the last field within the scheduling list to be scanned or serviced (e.g., transmitted), and/or the next field to be serviced (e.g., indicating that a particular VC is to be transmitted next), depending upon the situation. For the purposes of the FIGS. 5a through 5d and the subsequent examples in FIGS. 6a through 6q, the current time index is referred to as the "C" index, and each of the read time indexes are referred to as the "R#" indexes (e.g., R1, R2, etc.).

With this in mind, FIG. 5c shows a step 142 that begins with decision step 160 in which it is determined if there is a VC identified in the R1 indexed field within the highest priority scheduling list. If there is a VC identified in the R1 indexed field in the highest priority list, then in step 162 the next cell for the identified VC is transmitted during the transmission cycle associated with the current time index, assuming cells are available. Next, in step 164, the C index is advanced one step (e.g., to the next field). To demonstrate step 142, a method (using step 142) is graphically illustrated in an example scheduling and transmission sequence in FIGS. 6a through 6q, below.

Returning to step 160, if no VC is identified in the R1 indexed field, then in step 166 R1 and C are compared to determine if the read time(i.e., R1) for the first scheduling list is equal to the current time (i.e., C). If R1 does not equal C then in step 168 R1 is advanced one step (e.g., to the next field) and step 160 is repeated. As shown, steps 160, 166 and 168 are repeated until ether RI indexes a field identifying a VC, or R1 equals C. If the R1 index is equal to the C index then method 100 proceeds to check the next scheduling list for an identified VC awaiting to be serviced (i.e., have the next cell transmitted).

In step 170 it is determined if there a VC identified in the R2 indexed field within the next lower priority scheduling list. If there is a VC identified in the R2 indexed field, then in step 172 the next cell for the identified VC is transmitted, and in step 174 the C index is advanced one step. If no VC is identified in the R2 indexed field, then in step 176 R2 and C are compared. If R2 does not equal C then in step 178 R2 is advanced one step and step 170 is repeated. As shown, steps 170, 176 and 178 are repeated until ether R2 indexes a field identifying a VC, or R2 equals C. If the R2 index is equal to the C index then method 100 proceeds check the next scheduling list for an identified VC awaiting to be serviced.

Likewise for each remaining scheduling list, in step 180 it is determined if there is a VC identified in the R# indexed field within the scheduling list. If there is a VC identified in the R# indexed field, then in step 182 the next cell for the identified VC is transmitted, and in step 184 the C index is advanced one step. As before, if no VC is identified in the R# indexed field, then in step 186 R# and C are compared. If R# does not equal C, then in step 188 R# is advanced one step and step 180 is repeated. As before, steps 180, 186 and 188 are repeated until ether R# indexes a field identifying a VC, or R# equals C. If the R# index is equal to the C index, then method 100 does not transmit a cell during the transmission cycle represented by the C index, and in step 192 the C index is advanced one step. As shown, step 142 is completed following steps 164, 174, 184, or 192.

Figure 5D:
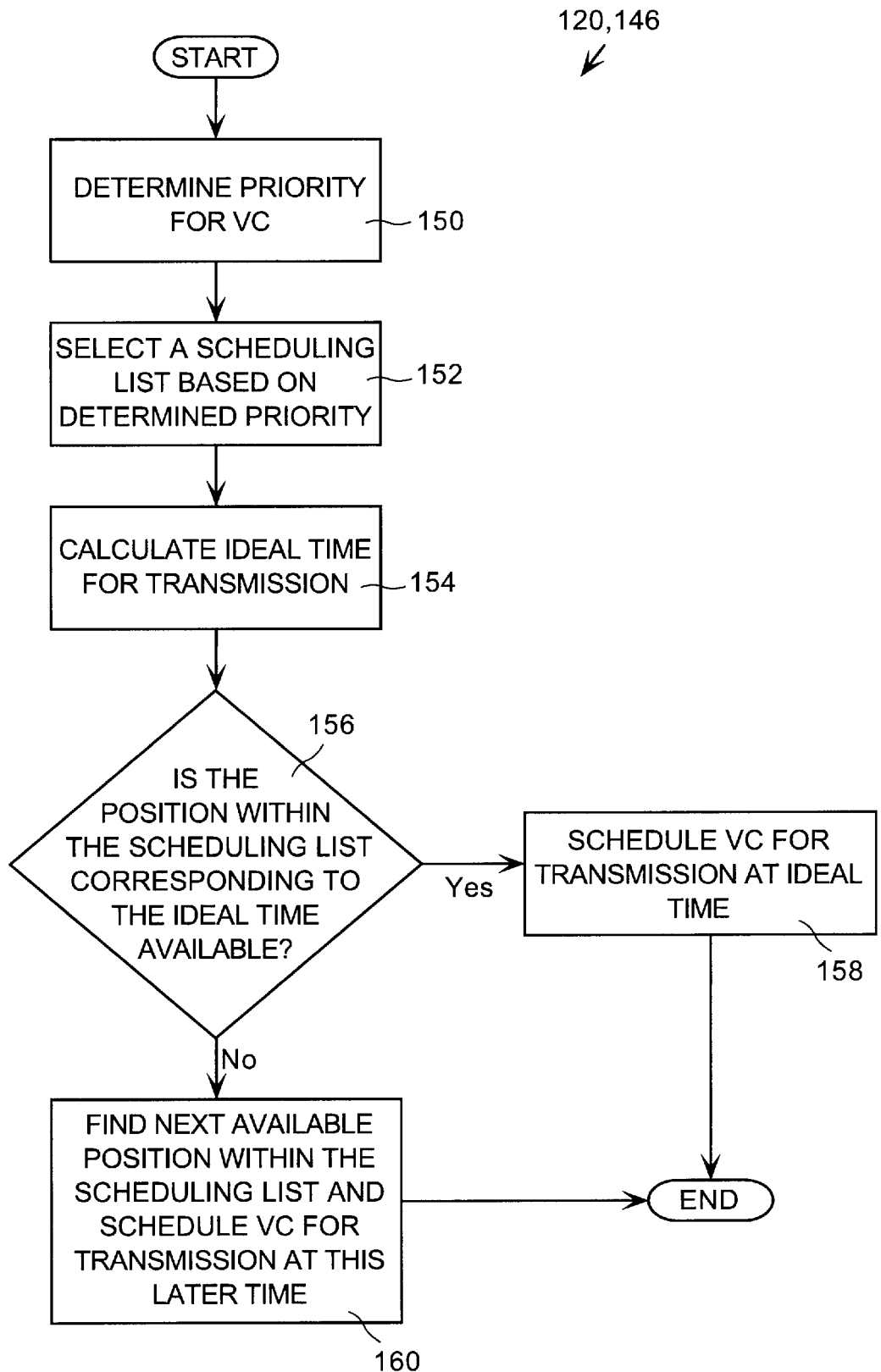
FIG. 5d is a flow-chart further illustrating steps for scheduling the next transmit time for a VC as in FIG. 5b, in accordance with one embodiment of the present invention.

FIG. 5d is a flow-chart further illustrating a cell scheduling algorithm of step 120 of FIG. 5a and step 146 of FIG. 5b, in accordance with one embodiment of the present invention. The cell scheduling algorithm begins with step 150 in which the priority for a particular VC is determined. This can, for example, include factors such as the type of traffic and other negotiated constraints associated with the VC. Thus, step 150 can for example be accomplished by a higher layer software program when establishing the VC. Once the VC's priority has been determined, in step 152 a corresponding scheduling list (e.g., one with the same priority) is selected.

In step 154 the ideal time to transmit the next (or first) cell for the VC is calculated. This can include, for example, using the Generic Cell Rate Algorithm (GCRA) as specified in the ATM Traffic Management Specification, Version 4.0. These and other transmit timing algorithms are well known to those skilled in the art and are currently used to conform cell transmissions to the ATM standards. The ATM Traffic Management Specification, Version 4.0 is hereby incorporated by reference.

Once the ideal transmission time has been calculated, step 156 determines if the field (within the scheduling list selected in step 152) which is associated with this ideal time is available to be assigned to the VC. If the field is available (that is it is un-assigned), then in step 158 the VC is assigned to that field, for example by placing an identifier in the field. If the field has already been assigned, for example to another VC, then in step 160 the next available field within the scheduling list is determined and the VC is assigned to this field. FIG. 5d is completed following steps 158 or 160.

It is recognized that additional steps can be included in step 160 that take into account assignment problems, such as for example not finding an open field in the scheduling list, and the like. Also, in step 160, a cumulative record can be kept that indicates that the resulting assignment for the VC is actually off-set from the ideal transmission time. This cumulative record can, for example, be used during subsequent iterations of the steps of FIG. 5d to adjust the transmission of subsequent cells to make-up for the off-set and resulting latency in the previous transmission(s).

Figure 6A:
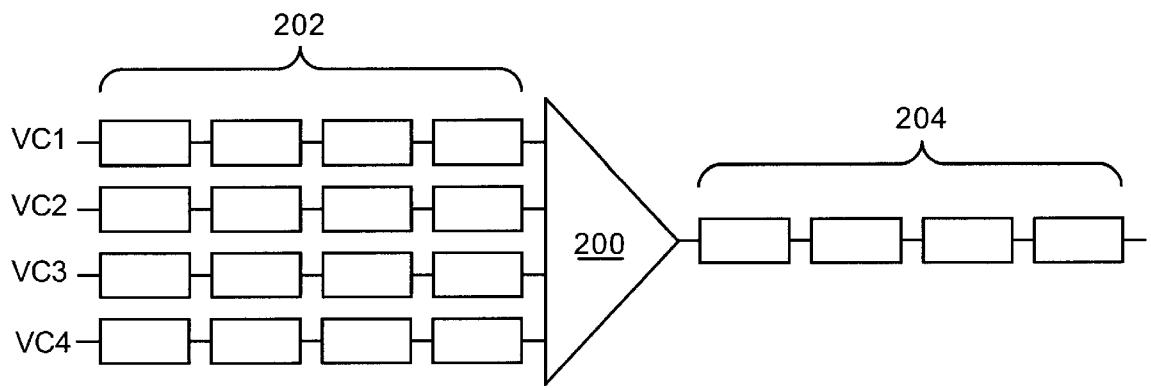
FIGS. 6a through 6q are diagrams of the scheduling lists that illustrate an example of a scheduling/transmission sequence as applied to four VCs, in accordance with one embodiment of the present invention.
Figure 6A:
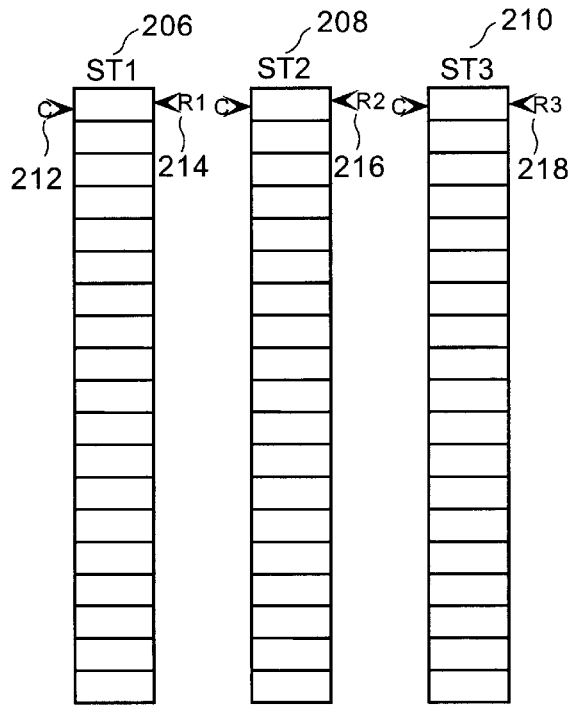
Figure 6B:
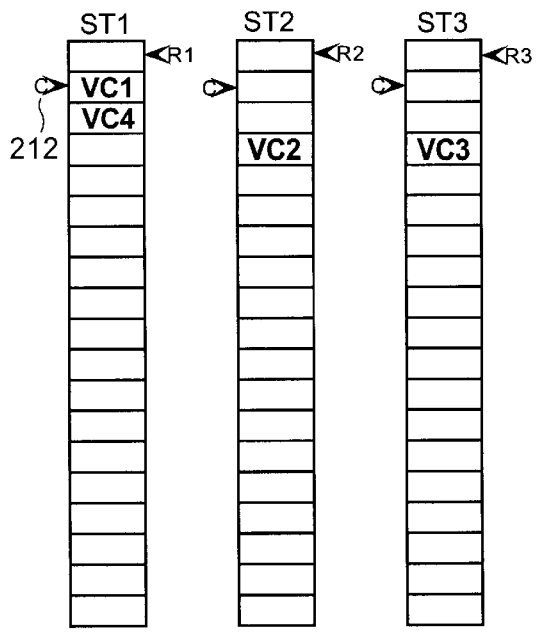
Figure 6C:
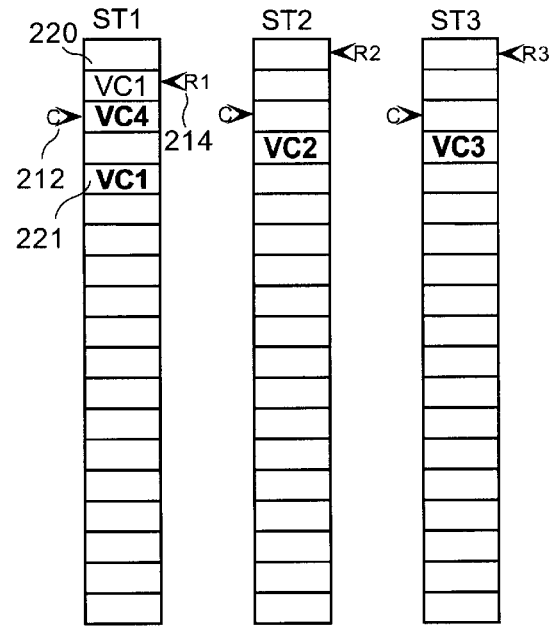
Figure 6D:
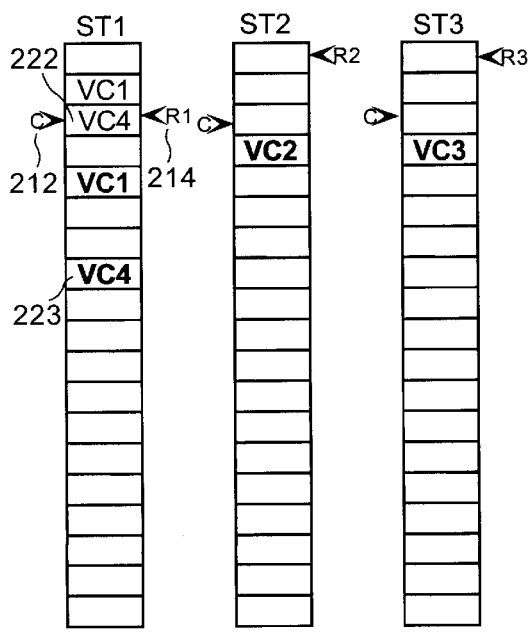
Figure 6E:
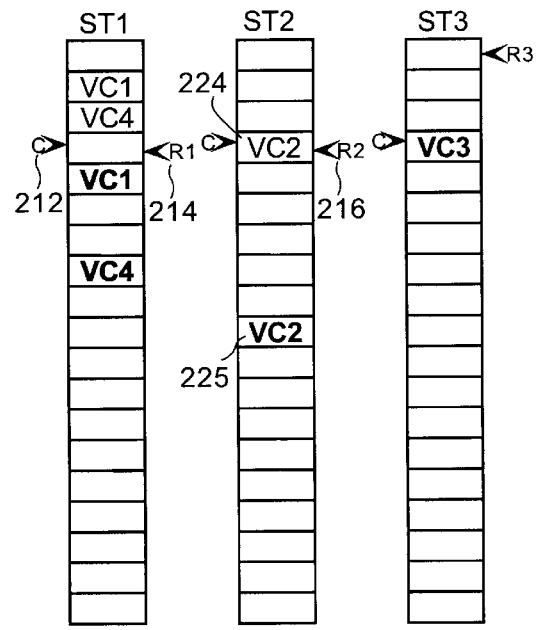
Figures 6J, 6K:
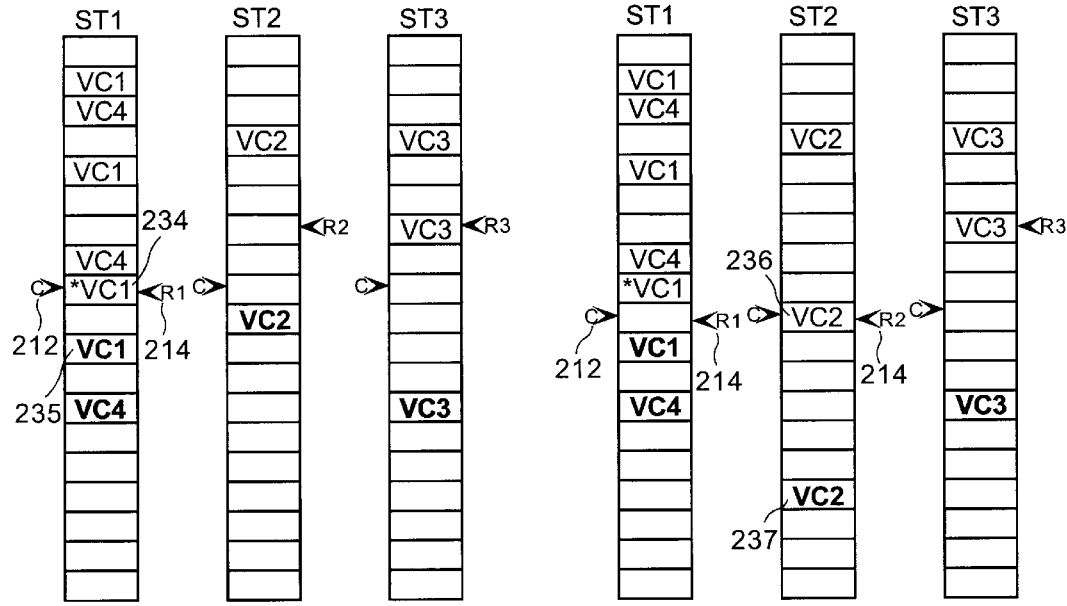
Figures 6L, 6M:
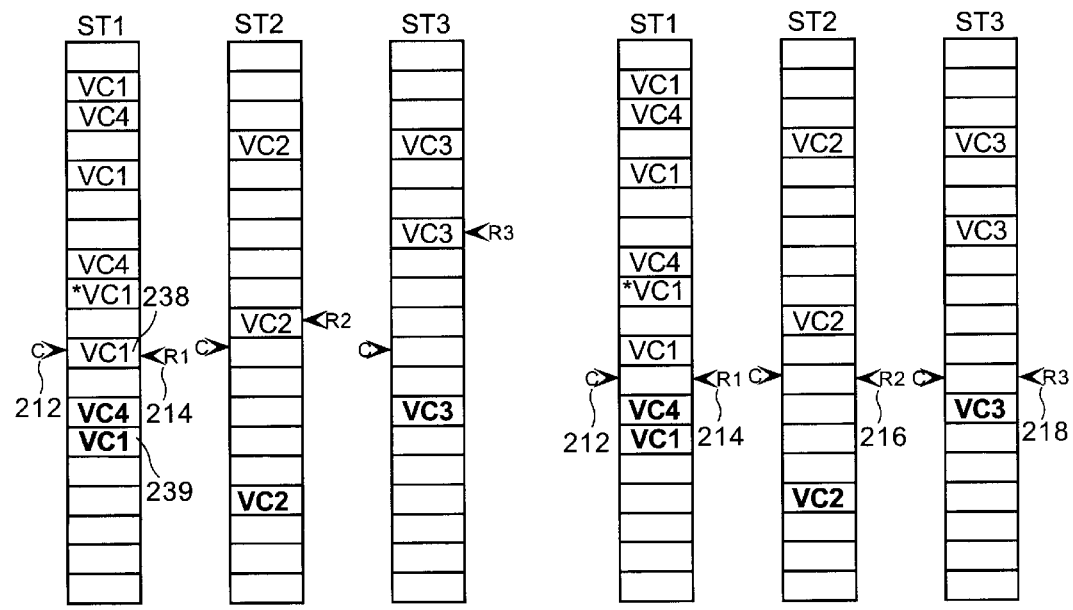
Figures 6N, 6O:
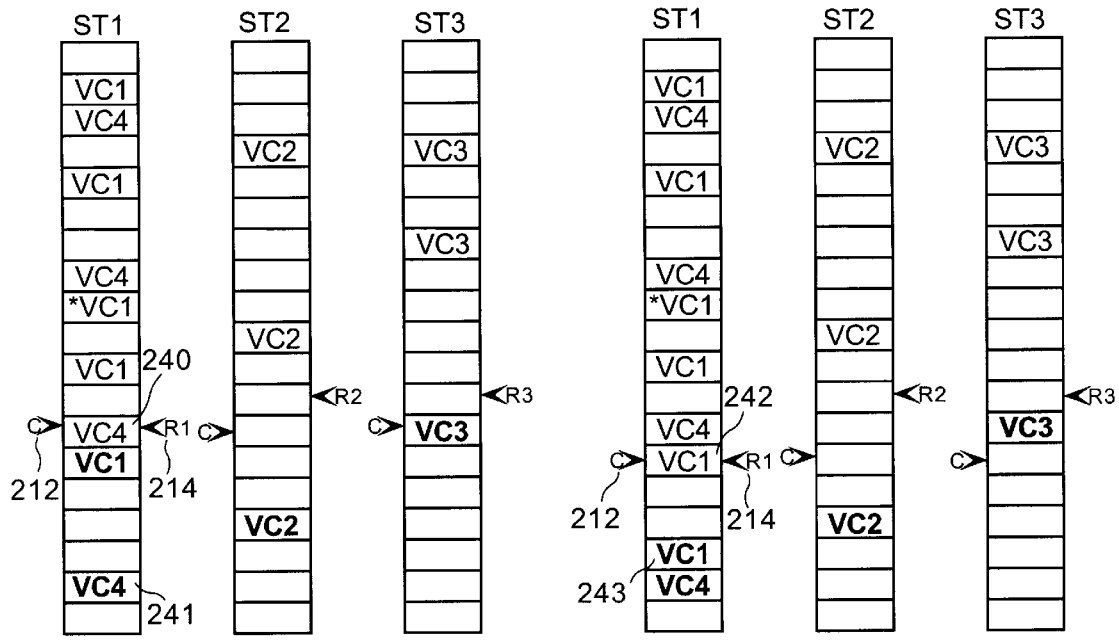
Figures 6P, 6Q:
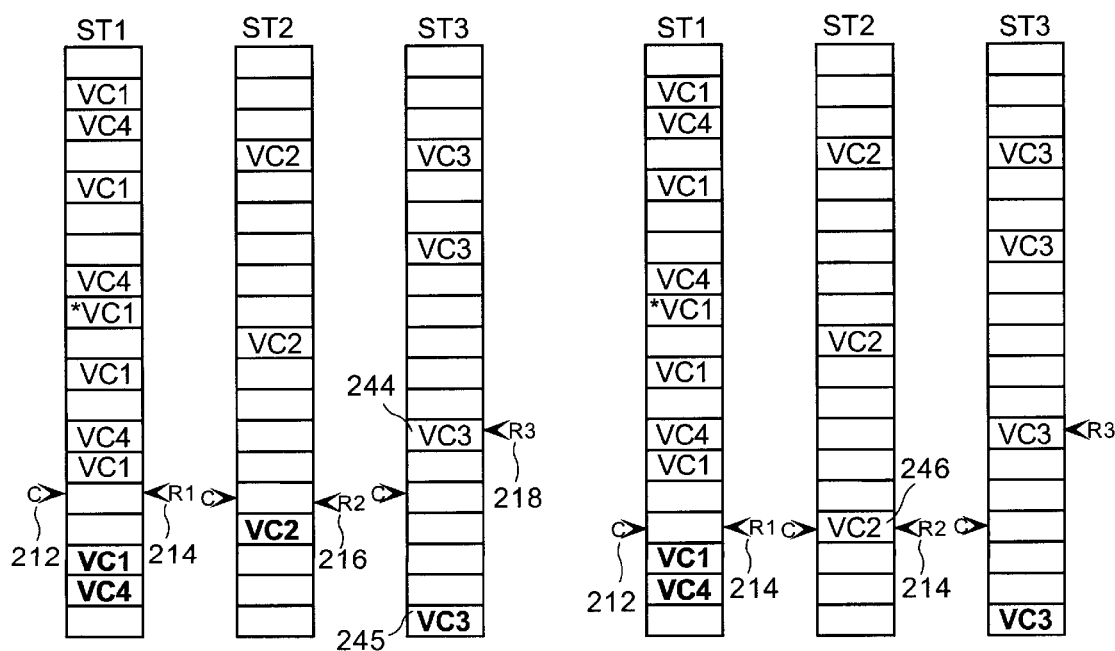

To further illustrate the methods and apparatuses of the present invention, FIGS. 6a through 6q are block diagrams that illustrate an example of a scheduling/transmission sequence as applied to four VC channels (VC1, VC2, VC3, and VC4) using three scheduling tables (i.e., one type of scheduling lists) (ST1, ST2 and ST3) over time, in accordance with one embodiment of the present invention. As shown in FIG. 6a there is a scheduler 200, a collection of data cells 202, and an interleaved stream of data cells 204. As indicated in FIG. 6a, for this example, VC1 is a high priority CBR channel with a PCR of one cell every 3 scheduling cycles (i.e., transmission or indexing cycles), VC2 is a medium priority VBR channel with a PCR of one cell every 6 scheduling cycles, VC3 is a low priority ABR channel, and VC4 is a is a high priority CBR channel with a PCR of one cell every 5 scheduling cycles.

Also shown in FIG. 6a are the three scheduling tables ST1 206, ST2 208, and ST3 210 which have priorities of "high", "medium" and "low", respectively. For each scheduling table there is shown a C index 212 that indicates the current time. Additionally, there is a R1 index 214 that indicates the read time for ST1, a R2 index 216 that indicates the read time for ST2, and a R3 index 218 that indicates the read time for ST3.

In FIG. 6b, it is assumed that VC1 through VC4 have each been established and have had some data cells already transmitted. Therefore, as shown, VC1 through VC4 have been assigned to particular fields in their corresponding scheduling tables, and the previous scheduling cycle has just been completed and C index 212 has just been advanced to its current position.

Next in FIG. 6c, once C index 212 has been advanced one position, R1 index 214 has been advanced to field 220, and the next available data cell for VC1 has been transmitted (indicated by un-bolded text), the next transmit time for VC1 has been scheduled for field 221 (i.e., 3 cycles later per the VC's PCR).

Next in FIG. 6d, once C index 212 is advanced one position, R1 index 214 is advanced to field 222, and the next available data cell for VC4 has been transmitted, the next transmit time for VC4 is scheduled for field 223 (i.e., 5 cycles later per the VC's PCR).

Next in FIG. 6e, C index 212 is advanced one position, R1 index 214 is advanced to equal C index 212, R2 index 216 is advanced to field 224 (i.e., next assigned field but not past C index 212). Once the next available data cell for VC2 has been transmitted, the next transmit time for VC2 is scheduled for field 225 (i.e., 6 cycles later per the VC's PCR).

Next in FIG. 6f, R1 index 214 is advanced to field 226 after the next available data cell for VC1 has been transmitted, the next transmit time for VC1 is scheduled for field 227, and C index 212 is advanced one position. Notice that in attempting to schedule VC1's next transmit time per the PCR of VC1, namely one cell every 3 cycles, a conflict occurred in ST1 because VC4 had already been scheduled for transmission 3 fields later than field 226. As a result, *VC1 is scheduled to transmit in the next open position, namely field 227. Thus, rather than transmitting at its ideal time, *VC1 will transmit one cycle later. Therefore, the "*" represents that VC1 is less than ideal and that an off-set exists.

Next in FIG. 6g, C index 212 is advanced one position, R1 index 214 is advanced to equal C index 212, R2 index 216 has been advanced to equal C index 212, R3 index 218 is advanced to field 228 where the next available data cell for VC3 is transmitted, and the next transmit time for VC3 is scheduled for field 229 (i.e., a variable number of cycles later, in this case 3).

Similarly, as shown in FIG. 6h, C index 212 is advanced one position, R1 index 214 and R2 index 216 have been advanced to equal C index 212, R3 index 218 has been advanced to field 230 where the next available data cell for VC3 is transmitted, and the next transmit time for VC3 is scheduled for field 231 (i.e., a variable No. of cycles later, in this case 6).

Next in FIG. 6*i*, once C index 212 is advanced one position, R1 index 214 is advanced to field 232, and the next available data cell for VC4 has been transmitted, the next transmit time for VC4 is scheduled for field 233 (i.e., 5 cycles later per the VC's PCR).

Next in FIG. 6*j*, R1 index 214 is advanced to field 234, where the next available data cell for *VC1 is transmitted, and the next transmit time for VC1 is scheduled for field 235, and C index 212 is advanced one position. Notice that field 235, which is advantageously only 2 fields away from field 234, effectively erases the off-set for *VC1 created in FIG. 6*f* by scheduling VC1 in accordance with the VC's PCR of 3 cycles and the VC's earlier ideal time.

Next in FIG. 6*k*, C index 212 is advanced one position, R1 index 214 is advanced to equal C index 212, R2 index 216 is advanced to field 236, and when the next available data cell for VC2 is transmitted, the next transmit time for VC2 is scheduled for field 237 (i.e., 6 cycles later per the VC's PCR).

In FIG. 6*l*, C index 212 is advanced one position, and R1 index 214 is advanced to field 238. When the next available data cell for VC1 is transmitted, the next transmit time for VC1 is scheduled for field 239 (i.e., 3 cycles later per the VC's PCR).

In FIG. 6*m*, R1 index 214, R2 index 216, and R3 index 218 have each been advanced to equal C index 212 because there are no VCs scheduled for transmission. As such, no data cells are transmitted and C index 212 has simply been advanced one position.

As shown in FIG. 6*n*, scheduler 200 gets back to transmitting data cells and scheduling transmits. In FIG. 6*n*, once C index 212 is advanced one position, R1 index 214 is advanced to field 240, and the next available data cell for VC4 is transmitted, the next transmit time for VC4 is scheduled for field 241 (i.e., 5 cycles later per the VC's PCR).

Next in FIG. 6*o*, once C index 212 is advanced one position, R1 index 214 is advanced to field 242, and the next available data cell for VC1 is transmitted, the next transmit time for VC1 is scheduled for field 243 (i.e., 3 cycles later per the VC's PCR).

In FIG. 6*p*, once C index 212 is advanced one position, R1 index 214 and R2 index 216 have been advanced to equal C index 212, R3 index 218 has been advanced to field 244, and the next available data cell for VC3 has been transmitted, the next transmit time for VC3 is scheduled for field 245 (i.e., a variable number of cycles later, in this case 6).

In the last illustration of this example, FIG. 6*q*, once C index 212 is advanced one position, R1 index 214 is advanced to equal C index 212, R2 index 216 has been advanced to field 246, and the next available data cell for VC2 has been transmitted, the next transmit time for VC2 is scheduled for a later field (not shown, however 6 cycles later per the VC's PCR).

While this invention has been described in terms of several preferred embodiments, there are alterations, permutations, and equivalents which fall within the scope of this invention. For example, the apparatuses and methods of the present invention may be applied to other non-ATM configured networks and/or data transferring systems. It should also be noted that there are may alternative ways of implementing both the process and apparatus of the present invention. It is therefore intended that the following appended claims be interpreted as including all such alterations, permutations, and equivalents as fall within the true spirit and scope of the present invention.

What is claimed is:

1. A method for scheduling ATM cells for transmission over a network, comprising:

(a) providing a high-priority scheduling list having a plurality of high-priority fields therein, and a low-priority scheduling list having a plurality of low-priority fields therein;

(b) assigning a first virtual circuit to said high-priority scheduling list by placing a first identifier in a first field selected from said plurality of high-priority fields, and a second virtual circuit to said low-priority scheduling list by placing a second identifier in a second field selected from said plurality of low-priority fields;

(c) sequentially indexing through said plurality of high-priority and low-priority fields at the same time with an indexing mechanism; and (d) outputting;
  (i) a first data cell associated with said first virtual circuit if said indexing mechanism indexes to said first field before reaching said second field;
  (ii) said first data cell if said indexing mechanism indexes to said first and second fields at the same time;
  (iii) a second data cell associated with said second virtual circuit if said indexing mechanism indexes to said second field before reaching said first field;

wherein only one cell is output at one time.

2. The method as recited in claim 1 further comprising:

(e) outputting said second data cell if said first data cell has been transmitted in either of steps (d)(i) or (d)(ii) and said indexing mechanism has indexed to a third field in said high-priority scheduling list and said third field has not been assigned to said first virtual circuit.

3. The method as recited in claim 2 further comprising:

(f) repeating steps (b) through (e) for a plurality of sequentially arranged first and second data cells, such that no more than one of said first and second data cells are output during a single indexing cycle of said indexing mechanism.

4. The method as recited in claim 3 wherein step (b) further comprises:

(i) determining an ideal first field based on a first data rate associated with said first virtual circuit, wherein said ideal first field corresponds to a first ideal transmission time based on a duration of said single indexing cycle and a current indexing position of said indexing mechanism;

(ii) placing said first identifier in said ideal first field if said ideal first field is an unassigned high-priority field; and (iii) placing said first identifier in a subsequent unassigned high-priority field if said ideal first field is a previously assigned high-priority field.

5. The method as recited in claim 4 wherein said first data rate is capable of dynamically changing over time.

6. The method as recited in claim 3 wherein step (b) further comprises:

(iv) determining an ideal second field based on a second data rate associated with said second virtual circuit, wherein said ideal second field corresponds to a second ideal transmission time based on a duration of said single indexing cycle and a current indexing position of said indexing mechanism;

(ii) placing said second identifier in said ideal second field if said ideal second field is an unassigned low-priority field; and (iii) placing said second identifier in a subsequent unassigned low-priority field if said ideal second field is a previously assigned low-priority field.

7. The method as recited in claim 6 wherein said second data rate is capable of dynamically changing over time.

8. The method as recited in claim 1 wherein said first virtual circuit is an ATM compatible virtual circuit configured to transmit one selected from the group of a CBR, VBR, ABR, and UBR traffic type.

9. The method as recited in claim 1 wherein said second virtual circuit is an ATM compatible virtual circuit configured to transmit one selected from the group of a CBR, VBR, ABR, and UBR traffic type.

10. An apparatus for use in scheduling data cells for transmission, the apparatus comprising:

list generating means for providing a high-priority scheduling list having a plurality of high-priority fields therein, and a low-priority scheduling list having a plurality of low-priority fields therein;

assignment means for assigning a first virtual circuit to said high-priority scheduling list by placing a first identifier in a first field selected from said plurality of high-priority fields, and a second virtual circuit to said low-priority scheduling list by placing a second identifier in a second field selected from said plurality of low-priority fields;

indexing means for indexing through said plurality of high-priority and low-priority fields at the same time; and transmission means for transmitting;

a first data cell associated with said first virtual circuit if said indexing means indexes said first field prior to indexing said second field;

said first data cell if said indexing means indexes said first and second fields together;

a second data cell associated with said second virtual circuit if said indexing means indexes said second field prior to indexing said first field;

wherein no more than one of said first and second data cells are transmitted during a single indexing cycle of said indexing means.

11. The apparatus as recited in claim 10 wherein said transmission means is also for transmitting said second data cell if said first data cell has been transmitted and said indexing means has subsequently indexed a third field in said high-priority scheduling list, wherein said third field is an unassigned high-priority field.

12. The apparatus as recited in claim 11 wherein said assignment means:

determines an ideal first field based a first data rate associated with said first virtual circuit, wherein said ideal first field corresponds to a first ideal transmission time based on a duration of said single indexing cycle and a current indexing position of said indexing means;

places said first identifier in said ideal first field if said ideal first field is an unassigned high-priority field; and places said first identifier in a subsequent unassigned high-priority field if said ideal first field is a previously assigned high-priority field.

13. The apparatus as recited in claim 12 wherein said first data rate is capable of dynamically changing over time.

14. The apparatus as recited in claim 12 wherein said assignment means:

determines an ideal second field based on a second data rate associated with said second virtual circuit, wherein said ideal second field corresponds to a second ideal transmission time based on a duration of said single indexing cycle and a current indexing position of said indexing means;

places said second identifier in said ideal second field if said ideal second field is an unassigned low-priority field; and places said second identifier in a subsequent unassigned low-priority field if said ideal second field is a previously assigned low-priority field.

15. The apparatus as recited in claim 14 wherein said second data rate is capable of dynamically changing over time.

16. The apparatus as recited in claim 10 wherein said first virtual circuit is an ATM compatible virtual circuit configured to transmit one selected from the group of a CBR, VBR, ABR, and UBR traffic type.

17. The apparatus as recited in claim 10 wherein said second virtual circuit is an ATM compatible virtual circuit configured to transmit one selected from the group of a CBR, VBR, ABR, and UBR traffic type.

18. A scheduler for transmitting data over a network, comprising:

a processor configured to generate a high-priority scheduling list having a plurality of high-priority fields therein, and a low-priority scheduling list having a plurality of low-priority fields therein, and capable of assigning a first virtual circuit to said high-priority scheduling list by placing a first identifier in a first field selected from said plurality of high-priority fields and a second virtual circuit to said low-priority scheduling list by placing a second identifier in a second field selected from said plurality of low-priority fields, and wherein said processor is further configured to simultaneously index through said plurality of high-priority and low-priority fields; and a memory suitable for use in storing said high-priority scheduling list and said low-priority scheduling list generated by said processor.

19. The scheduler as recited in claim 18 further comprising a buffer coupled to said processor and configured to store at least one data cell associated with at least one of said first virtual circuit and said second virtual circuit.

20. The scheduler as recited in claim 19 wherein said memory is further configured to store a plurality of data cells associated with at least one of said first virtual circuit and said second virtual circuit.

21. The scheduler as recited in claim 20 wherein said processor is further configured to move a first data cell associated with said first virtual circuit from said memory to said buffer when said first field is indexed before said second field is indexed.

22. The scheduler as recited in claim 21 wherein said processor is further configured to move said first data cell from said memory to said buffer when said first field and said second field are indexed together.

23. The scheduler as recited in claim 22 wherein said processor is further configured to move a second data cell associated with said second virtual circuit from said memory to said buffer when said second field is indexed before said first field is indexed.

24. The scheduler as recited in claim 23 wherein said processor is further configured to move said second data cell if said first data cell has been transmitted and a third field within said high-priority scheduling list is indexed, and wherein said third field is subsequent to said first field and is an unassigned high-priority field.

25. The scheduler as recited in claim 24 wherein said processor is further configured to move no more than one of said first and second data cells during a single indexing cycle.

26. The scheduler as recited in claim 19 wherein said processor is further configured to determine an ideal first field based a first data rate associated with said first virtual circuit, wherein said ideal first field corresponds to a first ideal transmission time based on a duration of a single indexing cycle and a current indexed position, place said first identifier in said ideal first field when said ideal first field is an unassigned high-priority field, and place said first identifier in a subsequent unassigned high-priority field when said ideal first field is a previously assigned high-priority field.

27. The scheduler as recited in claim 26 wherein said second data rate is capable of dynamically changing over time.

28. The scheduler as recited in claim 19 wherein said first virtual circuit is an ATM compatible virtual circuit configured to transmit one selected from the group of a CBR, VBR, ABR, and UBR traffic type.

29. The scheduler as recited in claim 19 wherein said second virtual circuit is an ATM compatible virtual circuit configured to transmit one selected from the group of a CBR, VBR, ABR, and UBR traffic type.

30. The scheduler as recited in claim 18 further comprising an interface module being coupled to said processor, the interface module being configured to communicate with said memory that is external to said scheduler.

31. A network interface circuit comprising said scheduler as recited in claim 18.

32. A computer system comprising said network interface circuit as recited in claim 31.

33. A method for scheduling and transmitting data cells, the method comprising:

providing a plurality of scheduling lists associated with a plurality of priorities that include a plurality of fields therein;

assigning at least two virtual circuits to the scheduling lists by placing corresponding identifiers in at least two different fields selected from said plurality of fields;

sequentially indexing through said plurality of fields in each of the plurality of scheduling lists at a same time; and transmitting a data cell associated with one of said at least two virtual circuits based upon which of said identifiers is indexed and said plurality of priorities of said scheduling lists.

* * * * *